Feb. 21, 1956 P. G. REGNA 2,735,441
VALVE CAGE ASSEMBLY
Filed March 5, 1951

INVENTOR.
PAUL G. REGNA
BY Carr & Carr & Gravely
ATTORNEYS

United States Patent Office

2,735,441
Patented Feb. 21, 1956

2,735,441

VALVE CAGE ASSEMBLY

Paul G. Regna, Hanley Hills, Mo., assignor to Wagner Electric Corporation, St. Louis, Mo., a corporation of Delaware Application March 5, 1951, Serial No. 213,867

3 Claims. (Cl. 137—102)

This invention relates in general to a cage assembly for pressure control mechanisms and, more particularly, to the fluid pressure control valves for air brakes, and the like, to which fluid pressure is to be supplied at varying selected values.

One of the principal objects of the present invention is to provide a fluid pressure control mechanism which is simple in construction, assembly and maintenance, and is particularly free from problems of alignment of the component parts thereof.

Another object of this invention is to provide a self-contained pre-loaded cage assembly free from problems of alignment both with regard to the component parts thereof and with regard to aligning the assembly within the mechanism in which it is to be used.

An additional object of the present invention is to provide a fluid pressure control mechanism with a spring-extended actuator adapted to transmit to the valve parts axial forces only.

A further object of the present invention is to provide a fluid valve mechanism having a reciprocating actuator cage which is readily removable and replaceable, and whose removal permits ready inspection of the valve of the control diaphragm and the exhaust valve member.

In the accompanying drawings which form part of this specification and wherein like numerals refer to like parts wherever they occur:

Figure 1:
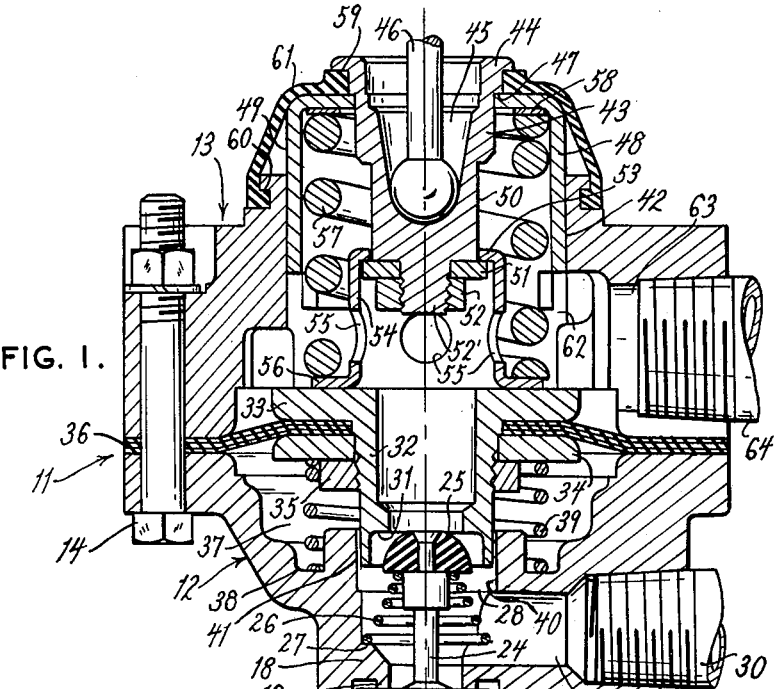
Fig. 1 is a vertical cross-sectional view of a fluid pressure control mechanism containing a cage assembly embodying my invention, with the parts thereof in position corresponding to absence of application of any external control force.

Referring now by reference characters to the drawings, which illustrate a preferred embodiment of the present invention, the present invention employed is shown positioned in a valve body 11 fabricated in two parts, a lower casing portion 12 and an upper casing portion 13, secured to each other on assembly by a plurality of bolts 14 around the periphery. The casing portions 12 and 13 are preferably produced by one of the more accurate casting processes, such as die casting, to minimize machining.

In general, the working parts of the control mechanism are aligned with reference to a central axis 15. Concentric with this axis and inserted in the bottom of the lower casing portion 12 is an inlet plug 16, to which is threadedly attached an inlet conduit 17 through which pressure fluid is supplied from a pressure source, not shown. The pressure fluid so supplied passes through a tubular throat 18 on which a projecting valve seat 19 is formed concentrically with the axis 15. Adapted for mating engagement with the valve seat 19 is a sealing insert 20 carried by a disk-like inlet valve 21.

The inlet valve 21 is secured by a nut 23 to the lower threaded end of a valve stem 24, to whose opposite, or upper end, is affixed a hemispherical exhaust valve 25. A tapered helical inlet valve spring 26 seated on a shoulder 27 in the lower casing portion 12 exerts a compressive force against the under side of the hemispherical exhaust valve 25 and in so doing urges the inlet valve 21 to closed position. The space 28 herein shown within the interior of the lower casing portion 12 located between the inlet valve 21 and the hemispherical exhaust valve 25 is referred to hereinafter as the valve chamber. Communicating with it is a sideward extending outlet port 29, in which is threadedly engaged an outlet conduit 30, through which pressure fluid is supplied to the mechanism controlled.

The hemispherical exhaust valve 25 mates with a seat 31 on a tubular exhaust valve stem 32, which extends upwardly therefrom and terminates in an outwardly turned flange portion 33, said exhaust valve stem 32 having a passage therethrough. Secured beneath said flange portion 33, by a flange washer 34 and a nut 35, is a diaphragm 36 made of flexible material. The diaphragm 36 extends outwardly from the wall of the tubular exhaust valve stem 32 to and between the upper casing portion 13 and the lower casing portion 12 of the valve body 11, where it is clamped by the bolts 14. This flexible diaphragm 36, which is sealed to the lower casing 12 and the tubular exhaust valve stem 32, forms with them an expansible pressure chamber designated 37, the base of which has an annular recess 38 for accommodating the base of the diaphragm return spring 39 whose upper portion bears against the flange washer 34. The tubular exhaust valve stem 32 is adapted to reciprocate along the axis 15 in a bore 40 in the lower casing portion 12. An annular passageway 41 provides communication between the valve chamber 28 and the expansible pressure chamber 37 whether the exhaust valve stem 32 is open, as shown in Figure 1, or depressed to the closed position shown in Figure 2.

The upper casing portion 13 is provided along the axis 15 with a wide bore 42 within which reciprocates the actuator cage assembly 43. This actuator cage assembly 43 comprises a central actuator rod receiving member 44 having a socket 45 therein adapted to receive force transmitted by the lower end of an actuator rod 46, by which the mechanism is controlled. Such control force is transmitted by a flange 47 near the upper extremity of the actuator rod receiving member 44 to an outer cage 48, whose outer cylindrical wall 49 is of such diameter as to permit its easy accommodation for reciprocation within the casing bore 42. The actuator rod receiving member 44 is provided at its lower portion with a cylindrical wall 50, beneath which a projecting washer 51 of greater diameter is secured by a nut 52 threaded upon a stud 52'. Adapted for reciprocation along the cylindrical wall 50 above the washer 51 is the inwardly turned flange 53 of an inner cage member 54, whose cage is provided with a plurality of exhaust apertures 55 and has as its lower portion an outwardly turned flange 56. The lower surface of said outwardly turned flange 56 is substantially flat along a plane normal to the axis 15, and contacts the upper surface of the flange portion 33 of the tubular exhaust valve stem 32. Inserted between the outer cage 48 and the inner cage 54 is a coiled actuator spring 57 which serves to transmit the control force from said outer cage member 48 to said inner cage member 54. A shim 58 may be employed between said spring 57 and the outer cage 48 to adjust and vary the spring's characteristics.

The upper casing portion 13 and the cage assembly 43 are sealed against dirt and foreign matter by a flexible sealing cap 61 made of synthetic rubber or other suitable material. The edges of this sealing cap 61 are inserted into the annular recess 59 in the actuator rod receiving member 44 and the annular recess 60 near the top of the upper casing portion.

The space within the upper casing portion 13 adjacent the exhaust apertures 55 and the inner cage member 54 forms an exhaust chamber 62. From said exhaust chamber 62, an exhaust port 63 permits the discharge of the pressure fluid through a conduit 64. The passage in the exhaust valve stem 32 extends through the diaphragm 36 and connects the pressure chamber 37 with the exhaust chamber 62 when the exhaust valve 25 is open as shown in Fig. 1.

The operation of the pressure control mechanism will be described, for purposes of illustration, as if it were incorporated in a braking system of an automotive vehicle for control of the pressures therein. For such utilization, the inlet conduit 17 would be connected to a reservoir within the vehicle, the outlet conduit 30 operatively connected to the vehicle brakes, the exhaust conduit 64 exhausted to the atmosphere, and the actuator rod 46 pin-connected or otherwise subjected to movement of the brake pedal or hand lever of the vehicle.

Figure 2:
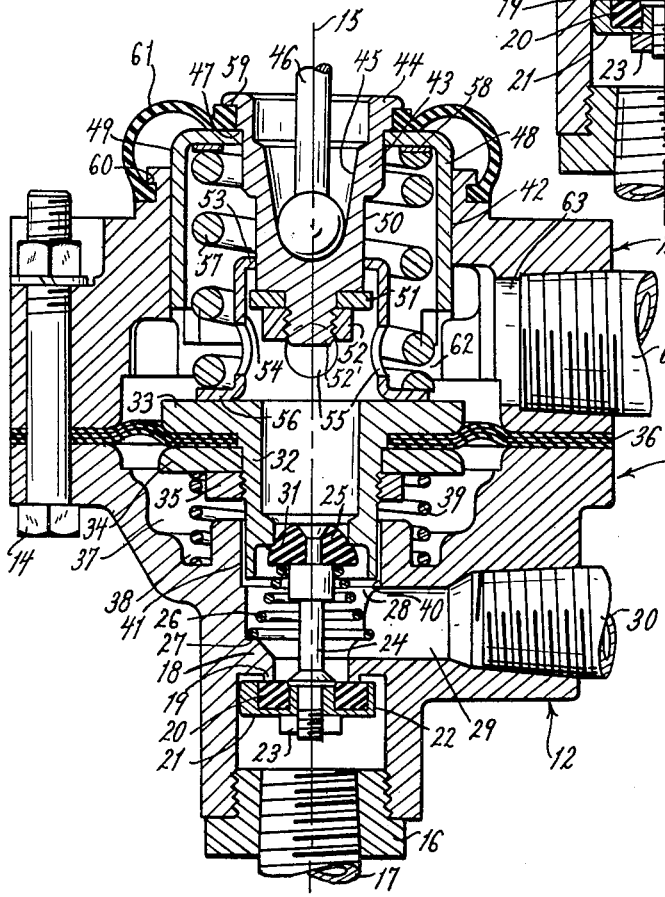
Fig. 2 is a similar vertical cross-sectional view showing the positions of the parts with pressure applied and both intake and exhaust valves closed.

With the brake pedal released, the parts of the mechanism would be in the positions shown in Figure 1; that is, the inlet valve 21 would be closed against the valve seat 19, the tubular exhaust valve stem 32 would be open, providing a communication between the brake system and the atmosphere, and the actuator cage assembly 43 would be fully extended and at the top of its stroke in the bore 42 of the upper casing 13. If now the operator of the vehicle desires to apply a braking force, the exertion of such force on the actuator rod 46 would cause first the lowering and closing of the tubular exhaust valve stem 32 against its hemispherical valve head 25 so as to cut off the communication between the vehicle braking system and the outside atmosphere. Further downward movement of the actuator rod 46 will cause the seat 31 of the exhaust valve stem to press against and lower the hemispherical valve 25 and, by movement of the valve stem 24, to open the inlet valve 21. Pressure fluid then flows past the inlet valve 21 and into the valve chamber 28, which flow will be communicated through the outlet port 29 and conduit 30 to the vehicle brakes. A portion of the flow, however, will be communicated through the annular passageway 41 into the expansible pressure chamber 37. The annular passageway 41 provides a restriction to prevent the build-up of pressure in pressure chamber 37 adjacent to the diaphragm 36 ahead of the pressure build-up in the brake operating cylinders. As the pressure increases in said pressure chamber 37, the force it exerts on the diaphragm 36 and flange washer 34 and nut 35 will cause the exhaust valve flange 33 to press upwardly against the flange 56 of the inner cage member 54. Such upward force is resisted by the operator of the vehicle by his control force exerted on the actuator rod 46, resulting in a compression of the actuator spring 57 and a telescoping of the cage assembly 43, as shown in Figure 2. During telescoping, the inwardly turned flange 53 of the inner cage member 54 rides along the cylindrical wall 50 of the rod receiving member 44. This telescoping continues until the brakes have been applied to the pressure desired by the operator, as reflected by the force applied by him to the control rod 46; when such pressure has been increased to the desired point, there will be a balancing of the upward forces within the expansible pressure chamber 37 (the fluid pressure plus the force of the diaphragm exhaust return spring 39). The result of such balancing will be a raising of the mechanism including the exhaust valve stem 32, the valve stem 24, and the parts affixed thereto, to the point that the inlet valve 21 is closed, as shown in Figure 2.

With a braking force so applied, should there be a leakage in the brake system and thus a diminution of pressure within the valve chamber 28, there would be a consequent loss of pressure in the expansible pressure chamber 37 and a lowering of the mechanism to open the inlet valve 21, resulting in a build-up of the lost pressure without further act by the operator of the vehicle. If the brakes have been applied to a certain pressure and an increase in pressure is desired, the application of increased force to the actuator rod 46 will likewise cause a lowering of the mechanism and opening of the inlet valve until the desired braking effort by the operator has been reached.

When the operator desires to release the brakes, a release of force on the actuator will result in an immediate raising of the tubular exhaust valve stem 32. It is apparent that if the inlet valve has been open, it will first close, and then the exhaust valve seat 31 will part from the hemispherical valve 25 to permit the release of the pressure fluid through the passage in tubular exhaust valve stem 32, the apertures 55 of the inner cage member 54 and the exhaust chamber 62 to the exhaust conduit 64.

Among the advantages of the present invention are ease of assembly and alignment and convenience in maintenance and repair. It is to be noted that both the inlet valve 21 and exhaust valve stem 32, respectively, are assembled or aligned with reference to the lower casing portion 12 only. The use of the seal 20 in the inlet valve 21 renders it substantially trouble-free. The tubular exhaust valve stem 32 is readily assembled to the flexible diaphragm 36 by means of the flange washer 34 and nut 35 and is readily inserted in its bore 40 without any alignment difficulties. Inasmuch as the entire actuator cage assembly 43 is inserted into the bore 42 from above, after assembly of the upper casing portion 13 with the lower casing portion 12, and inasmuch as it has no connection with the exhaust valve flange 33 other than by mere bearing flatwise against it, there can here be no possibility of misalignment. Further, the nature of the contact between the flange 56 of the inner cage member with the exhaust valve flange 33 makes it impossible to exert any force thereon other than an axial compressive force; consequently, there is no tendency for misalignment to develop in service.

The most important advantage of this self-contained pre-loaded cage assembly is that there is immediate transmittal of any downward force exerted on the actuator rod 46, and there is no time lag for first compressing a spring a predetermined amount before any downward movement is transmitted to the flange 33 of the tubular exhaust valve 32. The cage assembly of this invention is formed so that there is an immediate downward movement of the exhaust valve 32 upon movement of the actuator rod 46.

Inspection of the valve mechanism is rendered simple by the flexible sealing cap 61. On removing the actuator rod 46 the flexible sealing cap may be extended and removed from the recesses 59 and 60. This permits the withdrawal of the entire actuator cage assembly 43 for inspection and repair, and also to permit inspection of the diaphragm 36 and the hemispherical exhaust valve 25. The method of servicing the components of the structure will be apparent without further explanation. Apart from its function as permitting ready removal, the flexible sealing cap 61 functions, by its flexure, to permit the reciprocation within the bore 42 of the actuator cage assembly 43, as shown in Figure 2, without danger of entry of grit or moisture into the mechanism.

It is apparent that the use of such control mechanism is not limited to the illustration here employed, nor is it limited in its application to pneumatic pressures. It is likewise understood that changes and modifications in the form, construction, arrangement, and combination of the several parts of the pressure control mechanisms may be made and substituted for those herein shown and described

What I claim is:

1. In a fluid pressure control mechanism having a casing with a relatively large bore therein and abutment means in alignment with said bore, a self-contained preloaded cage assembly adapted to be slidably mounted in said bore in abutting relation to said abutment means, said cage assembly comprising a central member adapted to be moved by actuating means, a cage member positioned in abutting relation to said central member near one end thereof, said cage member having an exterior portion adapted to slidably contact the large bore in said casing, a projecting flange near the other end of said central member, a second cage member slidably carried by said central member, said second cage member having an outwardly extending flange at one end portion adapted to abut against said abutment means and an inwardly extending flange at the other end portion normally abutting said projecting flange and adapted to slide with respect to said central member between said projecting flange and the upper end of said central member, and a spring positioned between said cage members and holding the first cage member against the central member, said spring being held in compression between said cage members at all times.

2. In a fluid pressure control mechanism, a casing including first and second portions, movable means positioned between said portions, actuating means for moving said movable means, said first portion having an enlarged bore therein in axial alignment with said movable means, a self-contained pre-loaded cage assembly slidably mounted in said bore between said actuating means and said movable means, said cage assembly comprising a central member, a cage member positioned in abutting relation to said central member near one end thereof, said cage member having an exterior portion in sliding contacting relation with said enlarged bore, a projecting flange near the other end of said central member, a second cage member slidably carried by said central member, said second cage member having an outwardly extending flange in abutting relation to said movable means and an inwardly extending flange at the other end portion normally abutting said projecting flange and adapted to slide with respect to said central member between said projecting flange and the upper end of said central member, and a spring positioned between said cage members, said spring being held in compression between said cage members at all times, whereby said cage assembly instantly transmits movement of the actuating means to said movable means with no lost motion and whereby said spring is further compressed when said movable means is forced toward said cage assembly during actuation of said actuating means.

3. In a fluid pressure control mechanism, a casing comprising first and second portions, means including a flexible diaphragm for connecting said first and second portions, an exhaust chamber in said first portion adjacent one side of said diaphragm, an exhaust port for said exhaust chamber, a pressure chamber in said second portion adjacent said diaphragm on the side opposite said exhaust chamber, a valve chamber adjacent the lower end of said pressure chamber having inlet and outlet ports therein, an exhaust valve stem carried by said diaphragm and slidably received in said valve chamber, said exhaust valve stem having a passage therein for connecting said exhaust chamber with said valve chamber, a restricted passage for connecting said valve chamber with said pressure chamber, a spring biased exhaust valve in said valve chamber for controlling said passage in said exhaust valve stem, an inlet valve associated with said exhaust valve for controlling the flow of pressure fluid between said inlet port and said valve chamber, said first portion having an enlarged bore therein and a self-contained cage assembly reciprocally mounted in said bore and on first mentioned side of said diaphragm, said self-contained cage assembly comprising a central member, a cage member positioned in an abutting relation to said central member near one end thereof with the exterior of the cage member slidably contacting the wall of said bore, a projecting flange near the other end of said central member, a second cage member slidably and guidably carried by said central member, said second cage member having an annular flange in abutting relation with respect to said diaphragm and being adapted to move therewith, said second cage member having a second flange normally abutting said projecting flange and positioned between said projecting flange and the upper end of the central member, and a spring positioned between said cage members and holding said first cage member against said central member, said spring being held in compression between said cage members.

References Cited in the file of this patent

UNITED STATES PATENTS

| | | |
|---|---|---|
| 1,032,407 | Hill | July 16, 1912 |
| 1,404,464 | Meyer | Jan. 24, 1922 |
| 1,435,307 | Jones | Nov. 14, 1922 |
| 1,765,027 | Mitchell | June 17, 1930 |
| 1,834,245 | Kantor | Dec. 1, 1931 |
| 1,891,586 | Woerner | Dec. 20, 1932 |
| 2,106,483 | Hewitt | Jan. 25, 1938 |
| 2,226,972 | Greve | Dec. 31, 1940 |
| 2,229,057 | Dick | Jan. 21, 1941 |
| 2,259,280 | Wile | Oct. 14, 1941 |
| 2,313,991 | Fitch | Mar. 16, 1943 |
| 2,331,503 | Ray | Oct. 12, 1943 |
| 2,395,401 | Eaton | Feb. 26, 1946 |
| 2,412,725 | Fitch | Dec. 17, 1946 |
| 2,416,091 | Fitch | Feb. 18, 1947 |
| 2,488,949 | Walsh | Nov. 22, 1949 |
| 2,543,099 | Eaton | Feb. 27, 1951 |
| 2,603,231 | Birkenmeier | July 15, 1952 |